US009137043B2

(12) United States Patent
Fatula, Jr.

(10) Patent No.: US 9,137,043 B2
(45) Date of Patent: Sep. 15, 2015

(54) SYSTEM, METHOD AND PROGRAM FOR DETERMINING A NETWORK PATH BY WHICH TO SEND A MESSAGE

(75) Inventor: Joseph J. Fatula, Jr., San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1667 days.

(21) Appl. No.: 11/475,578

(22) Filed: Jun. 27, 2006

(65) Prior Publication Data

US 2007/0299954 A1    Dec. 27, 2007

(51) Int. Cl.
*H04L 12/46*    (2006.01)
*H04L 12/54*    (2013.01)
*H04L 12/701*    (2013.01)
*H04L 12/729*    (2013.01)
*H04L 12/721*    (2013.01)
*H04L 29/06*    (2006.01)

(52) U.S. Cl.
CPC ........ *H04L 12/4641* (2013.01); *H04L 12/5692* (2013.01); *H04L 45/00* (2013.01); *H04L 45/125* (2013.01); *H04L 45/26* (2013.01); *H04L 63/0272* (2013.01)

(58) Field of Classification Search
USPC ........................................................ 709/223
See application file for complete search history.

(56) References Cited

U.S. PATENT DOCUMENTS

| 6,079,020 | A  | * | 6/2000  | Liu ................................... 726/15 |
| 6,084,858 | A  | * | 7/2000  | Matthews et al. ............. 370/238 |
| 6,205,488 | B1 |   | 3/2001  | Casey et al. .................... 709/238 |
| 6,343,280 | B2 | * | 1/2002  | Clark ............................... 705/55 |
| 6,438,127 | B1 |   | 8/2002  | Le Goff et al. ................ 370/389 |
| 6,542,468 | B1 | * | 4/2003  | Hatakeyama ................... 370/238 |
| 6,606,645 | B1 | * | 8/2003  | Cohen et al. ................... 709/203 |
| 6,636,898 | B1 |   | 10/2003 | Ludovici et al. .............. 709/250 |
| 6,662,221 | B1 |   | 12/2003 | Gonda et al. ................... 709/223 |
| 2002/0161917 | A1 | * | 10/2002 | Shapiro et al. ................ 709/238 |
| 2002/0194335 | A1 | * | 12/2002 | Maynard ........................ 709/225 |
| 2003/0069958 | A1 |   | 4/2003  | Jalava ............................ 709/223 |
| 2003/0177396 | A1 |   | 9/2003  | Bartlett et al. ................ 713/201 |
| 2003/0233445 | A1 |   | 12/2003 | Levy et al. ..................... 709/224 |
| 2004/0210670 | A1 | * | 10/2004 | Anerousis et al. ............ 709/238 |
| 2005/0108386 | A1 | * | 5/2005  | Acharya et al. ............... 709/224 |
| 2005/0180319 | A1 | * | 8/2005  | Hutnik et al. .................. 370/229 |
| 2007/0033646 | A1 | * | 2/2007  | Tosey et al. ..................... 726/15 |

FOREIGN PATENT DOCUMENTS

CN            1689286 A1    10/2006

* cited by examiner

*Primary Examiner* — Joe Chacko
(74) *Attorney, Agent, or Firm* — Schmeiser, Olsen & Watts, LLP; William E. Schiesser

(57) ABSTRACT

System, method and program determining a network path by which a workstation can send a message to a target network. The workstation accesses a first part of the network path via a network access server. A plurality of other servers by which the workstation can access a second part of the network path leading to the target network are identified. Respective response times to communicate between the workstation or the network access server and each of the other servers are measured. A determination is made which one of the other servers has a shortest response time. The workstation attempts to connect to the one server, before attempting to connect to other of the other servers, to access the second part of the network. The second part of the network can be a virtual private network, and the other servers are entry point servers for respective virtual private networks.

9 Claims, 13 Drawing Sheets

SYSTEM, METHOD AND PROGRAM FOR DETERMINING A NETWORK PATH BY WHICH TO SEND A MESSAGE

FIELD OF THE INVENTION

The present invention relates generally to computer systems and networks, and more particularly to determining an efficient network path to send a message.

BACKGROUND OF THE INVENTION

The background is divided into the following sections: (i) connectivity of a workstation to a local Internet Service Provider's ("ISP's") Point of Presence ("POP"), (b) authentication and authorization by the ISP to permit connectivity to the public Internet, (c) connectivity to a VPN authentication and authorization service, and (d) connectivity of traffic through a secure tunnel established via a VPN.

Connectivity

Connectivity from a workstation such as a desktop, laptop, mobile device, server, computer, or other computing device (hereinafter referred to as a Workstation) to the Internet can be achieved using a variety of connection techniques. FIG. 1 illustrates typical user connectivity where workstations 100, 103, 130, 133, 136 and 150 obtain connectivity to the Internet via DSL, Dial-up, Cable, or Direct via LAN, flowing through an ISP's POP.

In DSL, Workstation 100 is connected via an Ethernet 105 or other wired or wireless medium to a DSL modem 106, which is connected in turn via a Telco (Telephone Company) line 108 to the Telco's public switch 111. In the switch, DSL traffic 112 is split off to a Digital Subscriber Line Access Multiplexer ("DSLAM") 113 which combines data streams from multiple DSL customers into a Telco high speed multiplexed line 121. The data over DSL traffic line 121 is routed to the Local ISP's POP 122 which is connected to the public Internet 170.

A traditional analog phone 101 is connected via a Plain Old Telephone System ("POTS") Filter (sometimes also called a DSL filter) 107 to the same telephone company line 108 as the DSL signal. A telephone 102 without a shared DSL signal is carried over line 109 without a POTS filter 107. This analog or voice signal on line 108 is connected to the Telco's public switch 111. The signal is directed over the public switched telephone network 114 to Telco's public switch 115 based on the telephone number dialed. From this point the signal is routed over the Telco line 116 to a destination telephone 117. These signals may be converted to other forms e.g. digital, time division multiplexed analog, and transmitted over other communication mediums during the trip from source to destination.

Workstation 103 can be a mobile device that connects via an analog modem 104 to a telephone line 110. It uses the same switched mechanism as the analog phone 101. However, in this case the dialed number destination is telephone company line 118 which in turn is connected to analog modem 119, which is connected to a Local ISP's POP 120.

Workstation 130 is connected to a cable modem 131. The cable modem is connected via cable 132 to the cable company's network 139. The network terminates at a cable head end transceiver 140 which is connected to a cable modem termination system ("CMTS") 141. This termination system is connected via a cable high speed multiplexed line 142 to the local ISP's POP 143. Workstations 133 and 136 use respective cable modems 134, 137 and respective cable 135, 138 for connectivity to the local ISP's POP 143.

A typical configuration used for small businesses is to have a local Ethernet or other physical or wireless network 153 forming a Local Area Network ("LAN") connecting their workstations 150, 151, 152. These are connected via any of the above communication media or other communication media. One such communication media is a Telco T1 fiber or copper high speed line 155 e.g. a T1 Line via interface translator 154. This interface translator is connected via a high speed media e.g. fiber, copper, microwave, 155 to a multiplexer 156. The multiplexer is connected via a Telco high speed multiplexed line 157 to the ISP's POP 158.

ISP POP Authentication and Authorization

FIG. 2 illustrates local ISP's ISP's 120, 122, 143 and 158 in more detail. FIG. 2 also illustrates "Telco, Cable High Speed Multiplexed Lines" which represent any of the communication media shown in FIG. 1 leading from workstations and phones 100-103, 130, 133, 136, and 150-152 to local ISP's POPs 120, 122, 143 and 158. FIG. 2 also illustrates ISP's Intranets 204 and 206 and ISP's Access Points 202 and 203 between Local ISP's POPs 208 and 222, respectively, and Internet 170. Local ISP's POP 208 comprises an authentication and authorization service 207 and a network access server ("NAS") 206. Local ISP's POP 222 comprises an authentication and authorization service 221 (such as a known Radius™ service), and a network access server ("NAS") 220.

The local ISP's POPs authenticate the workstation attempting connectivity to the public Internet 201 using respective authentication and authorization service 207 and 221. One such authentication technique uses PPP protocol (Point to Point Protocol) to pass userid or user name information and password to the respective Network Access Server ("NAS") 206 or 220. The client software in the workstation encrypts the password information (and optionally the userid) for sending to the NAS 206 or 220. The NAS 206 or 220 then communicates this information to the respective Authentication and Authorization Service 207 or 221. Alternatively, the Client may communicate this information directly to the authentication and authorization service 207 or 221. The service 207 or 221 then returns an "accepted", "rejected", or other type of response. If "accepted", the NAS then allows the workstation to access the public Internet 201 via the ISPs private internet 204 or 205 through its ISP's Internet Access Point 202 or 203. Alternatively, the authentication and authorization service maybe performed externally by an ISP's Authentication and Authorization Service 210 from the Local ISP's POP. Many other implementations and configurations are also possible. This authorization and authentication may also be performed by services, servers, or devices on the network where the user connects firewalls, routers, or firewall servers, that provide the userid and password information to the ISP's POP, hiding this information from the user.

Connectivity to the VPN Authentication and Authorization Service

FIG. 3 illustrates a possible configuration of any of workstations 100, 103, 130, 133, 136, 150, 151, 152, forming a "client". One example of Client Workstation 100, 103, 130, 133, 136, 150, 151, 152 configuration comprises an operating system 320, direct access storage devices 331, random access memory 332, read only memory 333, one or more central processing units 330, network connectivity 334, user interface, 335, and Client Software comprising various components, modules or functions 310, 311.

The Client Software may comprise two distinct functions—Dial-up Client Software 310 and VPN (Virtual Private Network) Client Software 311. These can sometimes appear as one software program with options or may be separate programs, modules, etc. The Dial-up Software 310 provides the connection via the telephone company to the ISP's POP (Internet Service Provider's Point of Presence Server). It uses the authentication and authorization service to determine if the Client is permitted access to the Internet through the ISP's Network Access Server and if granted provides the conduit. VPN Client Software 311 provides the connection to the VPN service provider. It exchanges authentication information with the VPN provider and if authorized, receives a list of VPN Entry Points. These are locations where one end of the VPN Secure Tunnel may be opened, with the other end being the VPN Client Software 311. The VPN Client Software 311 provides encryption and optional compression services for all traffic sent over the VPN Secure Tunnel. It also provides decryption and optional decompression services for all traffic received over the VPN Secure Tunnel.

VPN Authorization and Authentication

FIG. 4 illustrates a company with two site locations—San Jose, Calif. 451 and NY City, N.Y. 480. It further illustrates two remote users in two different locations—user 403 in San Jose, Calif. and user 428 in NY City.

FIG. 4 illustrates workstations 401, 425, 456, 457, 466 and 467 which comprise similar components and configuration as workstations 100, 103, 130, 133, 136, 150, 151 and 152. FIG. 4 also illustrates local ISP's POPs 402, 410, 440, 450, 460 and 470 which comprise similar components and configuration as ISP's POPs 120, 122, 143 and 158. Thus, authentication and authorization services 414, 416 and 418 are similar to authentication and authorization services 207 and 221, and NASs 415, 417 and 419 are similar to NASs 206 and 220. Also, each Workstation of FIG. 4 uses a connectivity technique such as that illustrated in FIG. 1 and an authorization and authentication technique such as that illustrated in FIG. 2 to connect to the public internet, and a VPN authorization and authentication technique such as shown in FIG. 4 to use a VPN. In the example of FIG. 4, a Client Workstation in San Jose, Calif. 401 is connected to a local network 404 in San Jose. For example, the network is connected to a DSL modem/interface 405 which is further connected through the local Telco public switch 406 to a Digital Subscriber Line Access Multiplexer ("DSLAM") 407 and then to a local ISP's POP 402 in the same area as San Jose, Calif. Each ISP's POP 450, 460 and 470 has a respective Intranet 204, 205 and respective ISP's Intranet Access Points 202, 203 as show in FIG. 2, even though not shown on FIG. 4.

A DSL modem/interface, in this example a Firewall router with DSL capability, provides the UserID/Password authentication to the ISP's POP 402's NAS 408 and Authentication and Authorization Service 409 in San Jose, Calif. Assume that Authentication and Authorization Service 409 has approved the connection and the NAS 408 has been instructed to permit connection to be made to and from the client Workstation 401 in San Jose, Calif. to the Internet 201. The second user 428, located in New York City, accesses workstation 425 and begins the connection through a dial up analog modem 424, also located with the workstation 425. The entry point into the phone network for workstation 425 is via the Telco Public Switch 423 in New York City. The user 428 has the option to dial phone numbers associated with one or more of the ISP's POP servers 420 or 440. In this example, one phone number is for the local POP 440 in New York City, and connectivity is made via Telco public switch 442, analog modem 441 near the POP 440, and POP 440. Also in this example, a second phone number is for the local POP 420 in San Jose, Calif. containing a NAS 410 and Authentication and Authorization Service 411. When the workstation 425 dials the second phone number, a connection is made via the local Telco public switch 423 to the San Jose, Calif. Telco public switch 422, through the analog modem 421 near the San Jose, Calif. POP 420 to the POP 420.

Similarly to the user connectivity, connectivity from Company A in San Jose, Calif. 451 is made to the Internet 201 via a VPN gateway server 454 to the local POP 450 with both NAS 415 and Authentication and Authorization Service 414. Within Company A 451, various workstations or servers 456, 457 are connected to the local network 455, which is connected to the VPN gateway server 454. A similar connectivity exists for Company A's location in New York City 480, with workstations or servers in NY City 466 and 467 connected to a local network 465 connected to the VPN gateway server 464 in NY City. The VPN gateway 464 is connected to a local ISP's POP 480 in NY City with both NAS 417 and Authentication and Authorization Service 416, connected to the Internet 201. Using the VPN, Company A's facility 451 in San Jose can be connected to its facility 480 in NY City via this virtual connection through the Internet 201. In concept this appears as a virtual connection 458. In another implementation, this connection between 451 and 480 can be a dedicated connection not using a VPN.

VPN provider 490 provides both access control 491 and Authentication and Authorization Services 492 for the VPN 458. This service may be contained within the VPN gateway server 454, 464 or may be externalized on the Internet 170 via a POP connection 470 containing Internet access NAS 419 and Internet Authentication and Authorization Service 418 to the Internet 201.

Simplified VPN Authentication and Authorization

FIG. 5 is a simplified diagram that hides the ISPs and the intermediate connectivity products that permit the Client to access the Internet. The purpose of FIG. 5 is to show the main VPN mechanism. The User 403 on Workstation 401 activates the VPN Client Software component 311 of the Client Software. This Client Software prompts the user for user name or userid and password type of authentication information. The VPN Client Software 311 attempts to establish a connection to the VPNs Authentication and Authorization Service 492 via the VPN access server 491 or directly. This VPN Provider's services 490 may be contained within the VPN gateway server 454 or 464 or other firewall, server or router. Once authenticated and authorized, the VPN Client Software 311 is permitted to establish a VPN Secure Tunnel to send and receive traffic to or from other Workstations on the private network 455 or 465. These private networks of Company A at locations 451 and 480 may also be connected together forming one larger logical network using a variety of products and technologies. Some of these products and technologies include a dedicated connection, a direct line, leased capacity from a shared line, a satellite link, a VPN using a similar technology to that which the user 403 used to connect.

Once the connection is established, all of the traffic routed over the VPN Secure Tunnel from a user 403 to the private network devices of facilities 451 or 480 and for other users 403 to the private network, all data in the tunnel is encrypted, may be compressed, and may be encapsulated in a standard TCP/IP data packet that can be transmitted over the public Internet. The VPN Client Software 311 provides the encryption/decryption, and optional compression/decompression at the Client user's end of the VPN Secure Tunnel. The VPN gateway server 454 or 464 provide the encryption/decryption and optional compression at the private network end of the VPN Secure Tunnel for the company facilities 451 or 480. If the two private networks were interconnected with one of the products or technologies described above, e.g. another VPN, then the two company locations can be made to appear as one large network spanning both.

Completed VPN Network

FIG. 6 shows how the connectivity appears to both the user and the networks and Workstations to which the User 403, 428 may be attempting communication or that may be attempting communication to the User 403, 428. The User 403, using Workstation 401, can connect to any of the permitted Workstations on the private network 605 whether the device is in Company A's facility 451 in one location or in Company A's facility 480 in another location or to another user 428 in a third location. The use of the encrypted traffic via the VPN Secure Tunnel over the public Internet can be thought of as operating invisibly in the background. The data contained in the packets on the public Internet are encrypted and of little or no value to unapproved listeners of traffic in the public world.

It was known for a user to send a secure message to a target or private network wherein part of the network path is through a virtual private network ("VPN") tunnel carried over the Internet as described. The VPN service provider typically registers the users "home" geographic location at the time the VPN account is created, i.e. the location where the user's workstation normally resides. However, often the user's workstation is not physically located at this geographic "home" location. This registration information is used to generate a list of potential VPN access points or entry point Servers which the VPN Client Software residing on the workstation can use to create one end of the VPN tunnel with the other end residing within the VPN Client Software.

FIG. 8 illustrates a Dialup and VPN connection process according to the Prior Art. The user initiates a dial-up Client Software program 310 (step 800) on workstation 425. Next, the user exchanges his or her userid and password with the dial-up Client Software program 310 (step 805). Next, the client dials the local ISP on behalf of the user (step 810). Next, the client exchanges the user's userid and password with the ISP POP 420 (step 815). In response, the ISP POP authentication service 411 authenticates the client based on the userid and password (step 820), and then authorizes NAS 410 for Internet Access (step 825), and returns to the client. Assuming Internet Access is available (decision 830), Client Software program 310 or the user then starts VPN Client Software program 311 (step 835). In response, Client Software program 311 provides the userid and password to VPN authentication and authorization service 492 to provide VPN authentication for Client workstation 425 (step 840). Next, VPN Access Server 491 looks up VPN entry point servers for the client (step 845). Next, Access Server 491 returns to the client a list of the VPN entry point servers in a predefined list (step 850). In response, Client Software program 311 selects a next (which during this first iteration is the first) VPN entry point gateway server in the list (step 855) and attempts to establish a VPN tunnel connection to that VPN gateway server 464 (step 860). If the tunnel is not available to be created (decision 865, no/Failed branch), then the Client Software program 311 attempts to establish a VPN tunnel connection to the next VPN entry point gateway server in the list (step 855). When the Client Software program 311 is able to establish the VPN tunnel connection to one of the VPN entry point gateway servers (decision 865, yes branch), then the Client Software program 311 informs the user that the connection to the intended destination is complete (step 875). Next, Client Software program 311 begins to communicate with the intended destination via the Internet and VPN tunnel (step 880). (If a VPN tunnel is not able to be created to any of the VPN entry point gateway servers (decision 870), then Client Software program 311 notifies the user of the problem (step 872). In general, with the reliability of modern networks, the VPN Client Software almost always connects to a valid VPN entry point gateway server and creates a VPN tunnel on the first attempt. Having created this VPN tunnel, all workstations and network devices on the private network can be accessible to the Client 425, and the Client is accessible to them. All data transferred through the tunnel is encrypted and its contents are "effectively" hidden on the public Internet 201.

FIG. 9 illustrates Non-Dial-UP and VPN connection according to the Prior Art. In step 900, the user starts VPN Client Software 311. Next, VPN authentication and authorization services 492 authenticates the client based on the userid and password (step 905). Next, VPN Access Server 491 looks up the VPN entry point servers for the client's home location (step 910). Next, the VPN Access Server 491 returns a list of the VPN entry point gateway servers to the client (step 915). The list is ordered based on the proximity to the user's home location. At this point, the VPN Client Software selects the first or next entry point and attempts to make a connection. Authentication and authorization may be performed by a VPN entry point gateway server such as server 454 or 464 as show in FIG. 4. The entry point server, if it is able, creates one end of the secure VPN tunnel in step 925. It signals the VPN Client Software 311 of success or failure in decision 930. If successful (decision 930, yes branch), the Client Workstation also does some clean up work and informs the user of the success in step 940. If the Client is unable to contact or connect to the VPN entry point gateway server or the tunnel cannot be created (decision 930, no branch), the Client Workstation resumes with the next entry point gateway server on the list in step 920. Should all entry point servers on the list be exhausted without establishing a VPN tunnel, the Client Software terminates this activity in step 935, informs the user of the problem in step 937 and ends or exits. In general, with the reliability of modern networks, the VPN Client Software almost always connects to a valid VPN entry point server and creates a VPN tunnel on the first attempt. Having created this VPN tunnel, all workstations and network devices on the private network can be accessible to the Client Workstation 425, and the Client Workstation 425 is accessible to them. All data transferred through the tunnel is encrypted and its contents are "effectively" hidden on the public Internet 201.

In the Prior Art the Dial-Up Client Software 310 and the VPN Client Software 311 can be combined into one software package or module providing the equivalent functionality of both. For example, a mobile user is an employee of a corporation, and the target network may be the network of the employer corporation. The user at a mobile location either has access to the public internet e.g. a wireless location, a wired network location, or via a dial-in access. With the public Internet access, the user gains access to the corporations private network via the previously described process. The user activates a VPN Client Software or agent 311 of the Client Software on his or her workstation. After authenticating the user, the authentication service returns to the network Client a list of VPN entry point servers. The VPN Client Software 311 can then attempt connection to any of the VPN entry point servers and create a secure "tunnel" over the Internet. A secure "tunnel" encapsulates all traffic to and from the private network with encryption and optional compression. When providing the list of VPN entry point servers to the Client workstation, the authentication service generally provide a static list of the VPN entry point servers sorted by order of proximity to the user's home geographic location. Thus, the closest VPN entry point server to the user's home location is listed first, the next closest VPN entry point server to the user's home location is listed second, etc. Next, the VPN Client Software agent 311 attempts to connect to the first entry point server in the list, and if unsuccessful, it attempts to connect to the second VPN entry point server in the list, and so forth. When the network Client agent successfully connects to an entry point server in the list, it will not attempt to connect to any other subsequent entry point server further down in the list. Once the connection is established, it has created the VPN Secure Tunnel between the network Client 311 and the target network entry point server. Traffic between the Client and the target network will flow through this VPN entry point of the private network. The communication path from the Client workstation to the target network is transparent to the Client workstation. It will appear in many respects that the Client workstation is locally attached to the target network. Today's networks are very reliable and as such the Client usually is able to gain access to the first VPN entry point that it attempts to contact where authorized.

FIG. 7 illustrates a foregoing Prior Art process in a scenario which illustrates the inefficiency that arises. In this scenario, a User's home location is New York City; however, the User 403 has traveled to San Jose, Calif. The User 403 connects his or her Workstation 401 to the Internet in his or her hotel via a DSL modem. The DSL modem/router has already established a connection with the hotel's ISP via a secure mechanism hidden from the user. This provides the Workstation 401 and thus the User 403 access to the public Internet. The user desiring to connect to Company A's private network then activates the VPN Client Software to attempt to establish a VPN Secure Tunnel using the public Internet to the company's private network 455, 465 for access to Workstations 456, 457, 466, 467 e.g. which may be servers providing or requiring business information. The VPN authentication service, after authenticating and authorizing the user, returns the list of VPN entry point servers sorted with the user's home location at the start of the list. The VPN Client Software then begins the process of establishing a secure tunnel to the first entry point server which in this case is the New York City VPN Gateway Server 464. Upon successful authorization to this VPN entry point server 464, a secure VPN tunnel 760 is established. Once the tunnel 760 is established, between the Client Workstation 401 and the private network 465, all traffic from the Client Workstation 401 to the private company network 455, 458, 465 occurs through 761, 762. Traffic intended for Workstation 456 in San Jose, Calif. at Company A 451 then traverses the private network connection 458 via 763, 764. Thus, the traffic leaving the user's Workstation 401 destined for Company A in San Jose 451 is encrypted by the VPN Client Software, travels over the public Internet through the secure tunnel 760, is decrypted in New York City 480 by the 464 VPN Server. The traffic then travels over the private network from 465, 763, 455 to Workstation 456. The responding packet returns from Workstation 456 via 455 to 764 to 465 to the VPN entry point server 464 at which point it is encrypted and sent over the VPN Secure Tunnel on the public Internet to Workstation 401 where the VPN Client Software 311 decrypts the information.

In the case where the end user is residing at the same remote location but accessing the Internet via dial-up, the User 403 would use an analog modem to connect to the Telco line. The user then starts the Dial-Up Client software 310. The User 403 proceeds to provide userid and password to the dial-up Client Software 310 which initiates a call via the telephone company establishing an analog connection from the modem through the Telco public switches to the destination modem connected to the local ISP's POP. Most dial-up Clients attempt to provide a dial-in number for the closest POP to minimize long distance calling charges. The dial-up Client Software provides the authentication information to the ISP's POP and upon successful authentication, the Client is authorized to access the public Internet through the ISP's POP. At this point, the process resumes with the user activating the VPN Client Software to attempt to establish a VPN tunnel as described above. If the User 403 had manually dialed a location whether a San Jose number or a New York City number, the VPN would still attempt to connect through the New York City entry point of 464, as it is the first on the list of Servers to contact, causing the latency of having the information travel from San Jose, Calif. to NYC to the Server in San Jose, Calif. and then back again creating a major cross continent travel overhead on a single packet.

In another example, the user, company servers, and network are resident at the same location. If this was also the home location of the user, the VPN list of entry points returned would have a San Jose, Calif. VPN entry point at the start of the list. In this case, the Client Workstation 401 would have created a tunnel 766 to VPN entry point Server 454 in San Jose. The response time of the Client to the target server 456 would be dramatically shorter than that for the previous example.

If the time delay over paths 761, 763, 764, or 762 was 25 mSec each and the time delay over 767 or 768 was 1 mSec each, choosing the connection path of this first example would result in a delay of 100 mSec vs. about 2 mSec for the second example for each round trip data package that was sent. In this example, latency time would be about 50× worse for traffic following the VPN tunnel to NY City 760 vs. a VPN tunnel 766 to San Jose, Calif.

In the first example, the user was located in San Jose, Calif. and forms one end of the VPN tunnel with the New York City server forming the other end of the tunnel. The relationship can be approximately described as:

$$Tresponse = 2*Ttunnel + 2*Tprivatenetwork$$

Where:
Tresponse=overall delay time of any message traversing the tunnel from the Client to the destination server and back
Ttunnel=overall delay time any message entering and exiting the tunnel
Tprivatenetwork=overall delay time of any message traversing the Private network from VPN tunnel entry point to destination server In the San Jose, Calif. and NYC examples above this reduces to approximately four cross continent trips for each data packet/response pair vs. two short hops from San Jose to San Jose if VPN tunnel 766 were created saving significant bandwidth and thus cost for Company A and for the carriers providing the Internet service.

In general, the latency problem is magnified when the VPN entry point is far from the Client whereas the destination Server on the private network is close to the Client. The problem is independent of the access method whether dial-up, DSL, LAN, etc. Also, the physical distance between the end points of the VPN tunnel and between the tunnel entry point and the server being accessed provides a first order of magnitude of a measurement of the problem. Measuring the real time response of the networks can allow the VPN Client Software to optimally select the best performance possible for the end user.

While the foregoing Prior Art process is effective in selecting a usable VPN entry point server and creating an associated VPN tunnel, the selected entry point server may not be the most efficient to communicate the user's message to the target network (and vice versa).

Accordingly, an object of the present invention is to determine an optimal VPN (or other) entry point server for a secure connection between a Client workstation and a target network.

Another object of the present invention is to determine an optimum VPN (or other) entry point server for a secure connection between a Client workstation and a target network when the Client workstation is mobile.

SUMMARY OF THE INVENTION

The present invention resides in a system, method and program determining a network path by which a workstation can send a message to a target network. The workstation accesses a first part of the network path via a network access server. A plurality of other servers by which the workstation can access a second part of the network path leading to the target network are identified. Respective response times to communicate between the workstation or the network access server and each of the other servers are measured. A determination is made which one of the other servers has a shortest response time. The workstation attempts to connect to the one server, before attempting to connect to other of the other servers, to access the second part of the network. The second part of the network can be a virtual private network, and the other servers are entry point servers for respective virtual private networks.

According to features of the present invention, the measurement of the response times can be performed by the network access server pinging each of the other servers and measuring respective response times, the other servers pinging the workstation or network access server and measuring respective response times, or the workstation pinging each of the other servers and measuring respective response times.

DETAILED DESCRIPTION OF THE PREFERRED EMBODIMENTS

Figure 1:
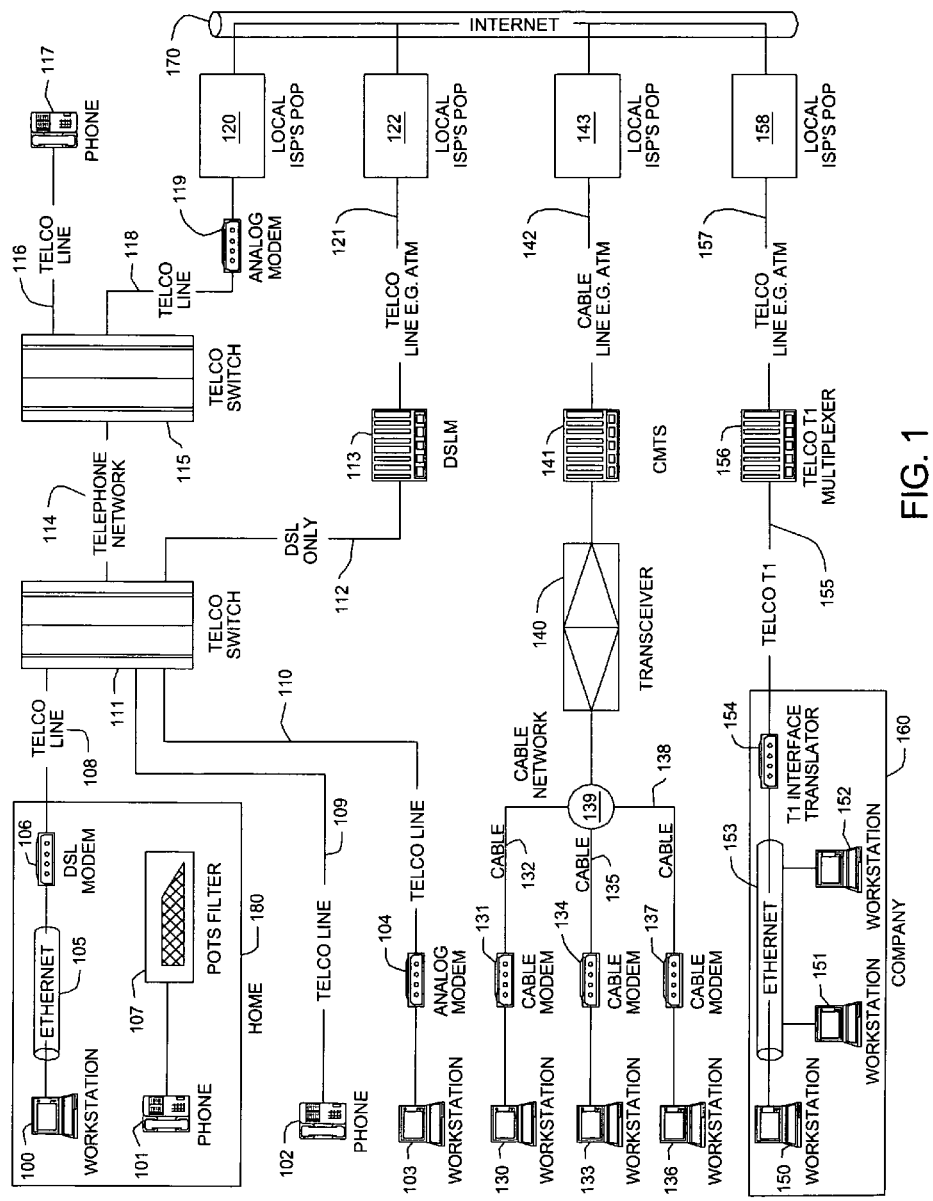
FIG. 1 is a block diagram of a Client workstation, authentication/network access, and ISP's POP, according to the Prior Art.
Figure 2:
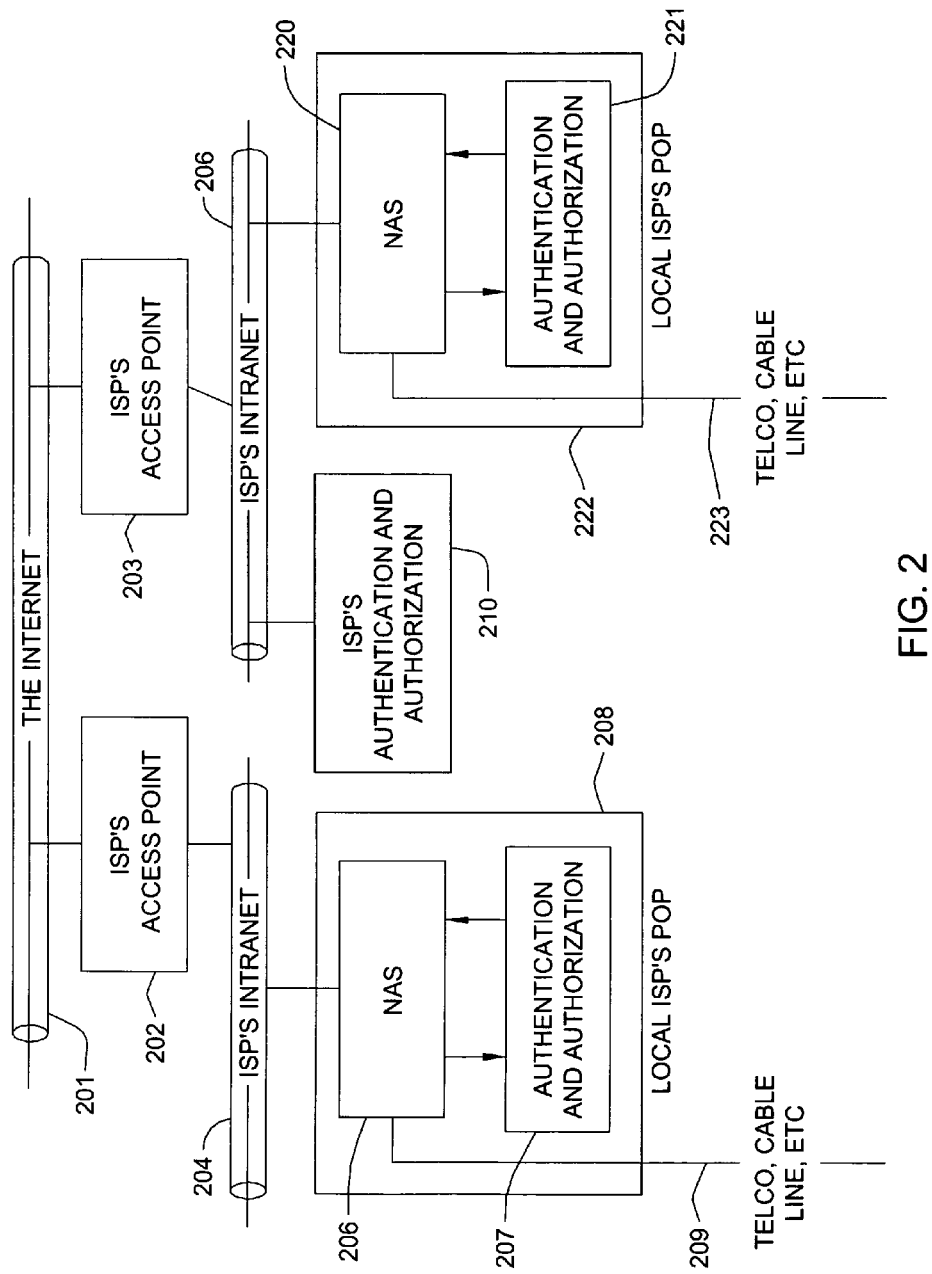
FIG. 2 is a diagram of the ISP's authentication and authorization, connectivity to ISP's LAN, and connectivity to the Internet, according to the Prior Art.
Figure 3:
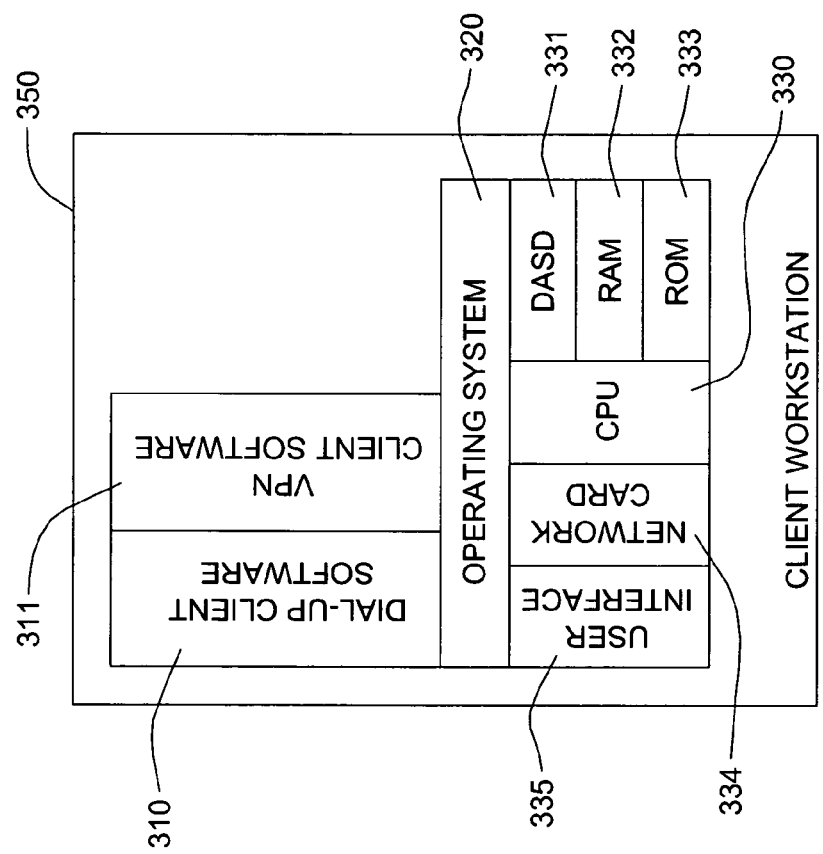
FIG. 3 is a block diagram of hardware and software within a Client, according to the Prior Art.
Figure 4:
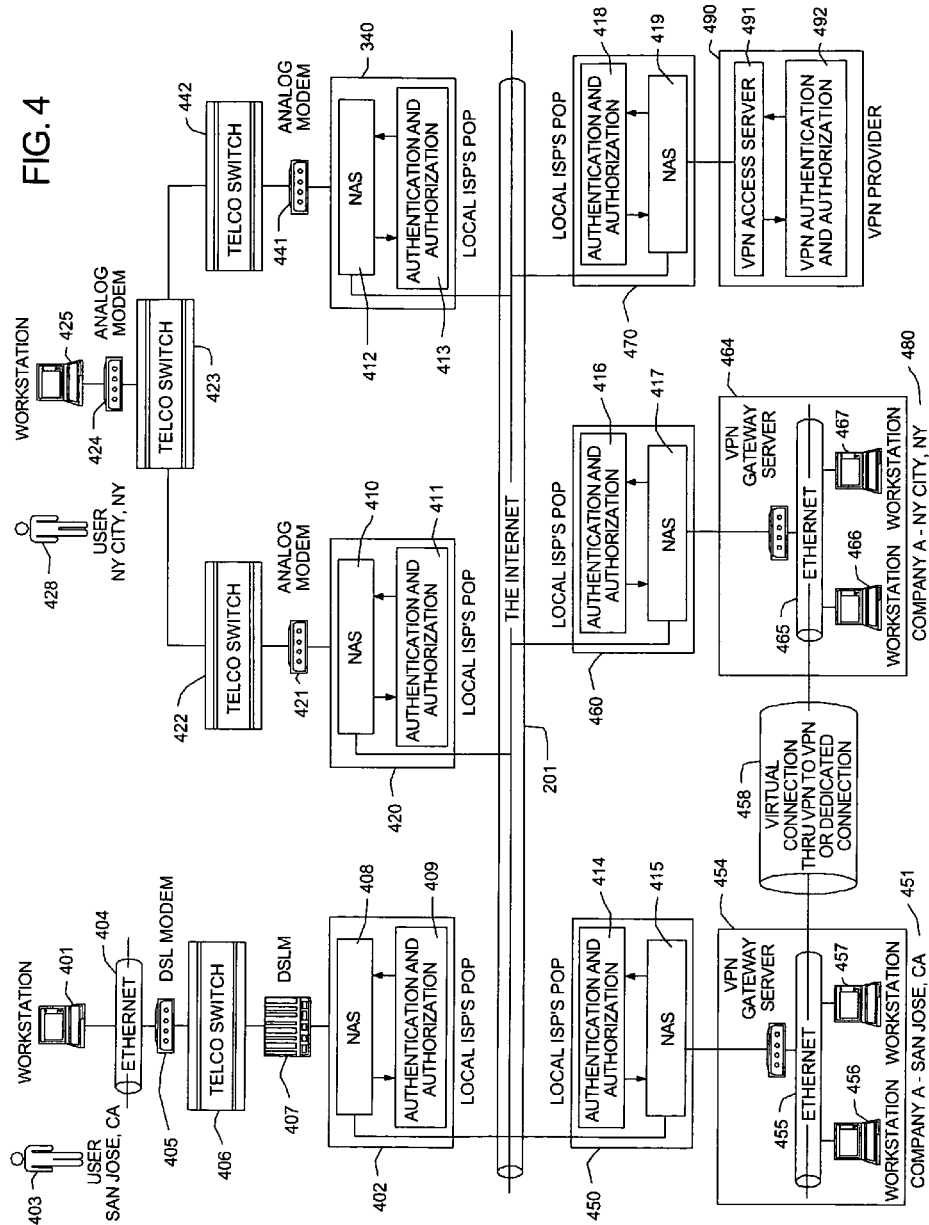
FIG. 4 is a block diagram of the VPN authorization and authentication process, according to the Prior Art
Figure 5:
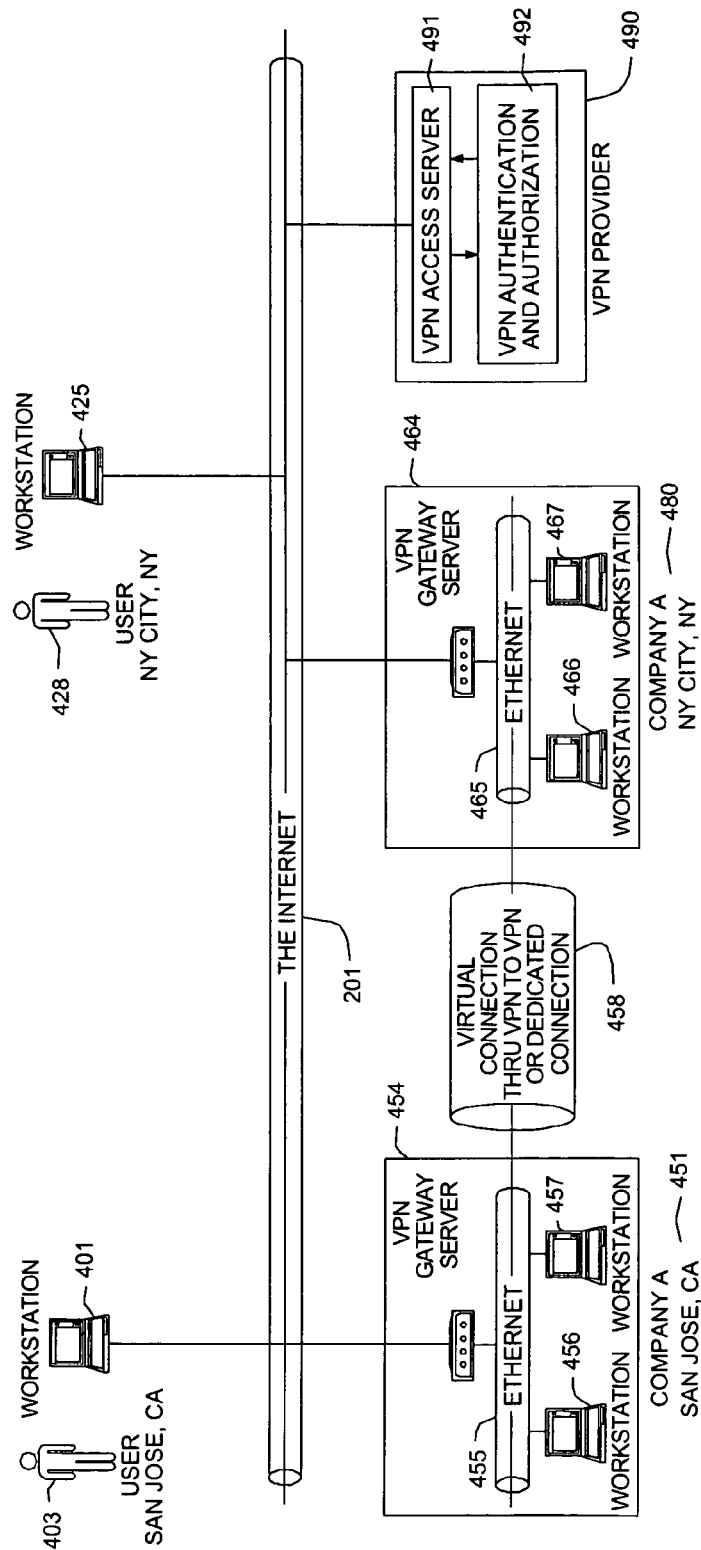
FIG. 5 is a simplified block diagram of the VPN authorization and authentication process, according to the Prior Art.
Figure 6:
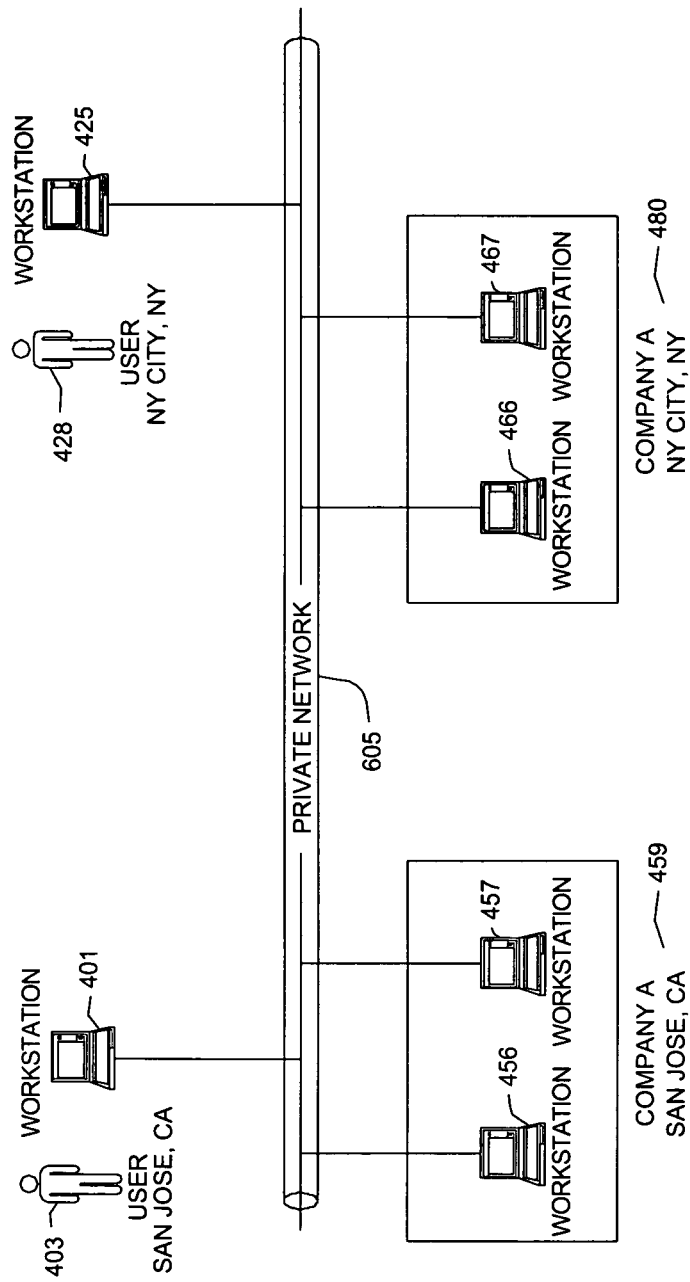
FIG. 6 is a block diagram of the final connection after completion of the VPN, according to the Prior Art.
Figure 7:
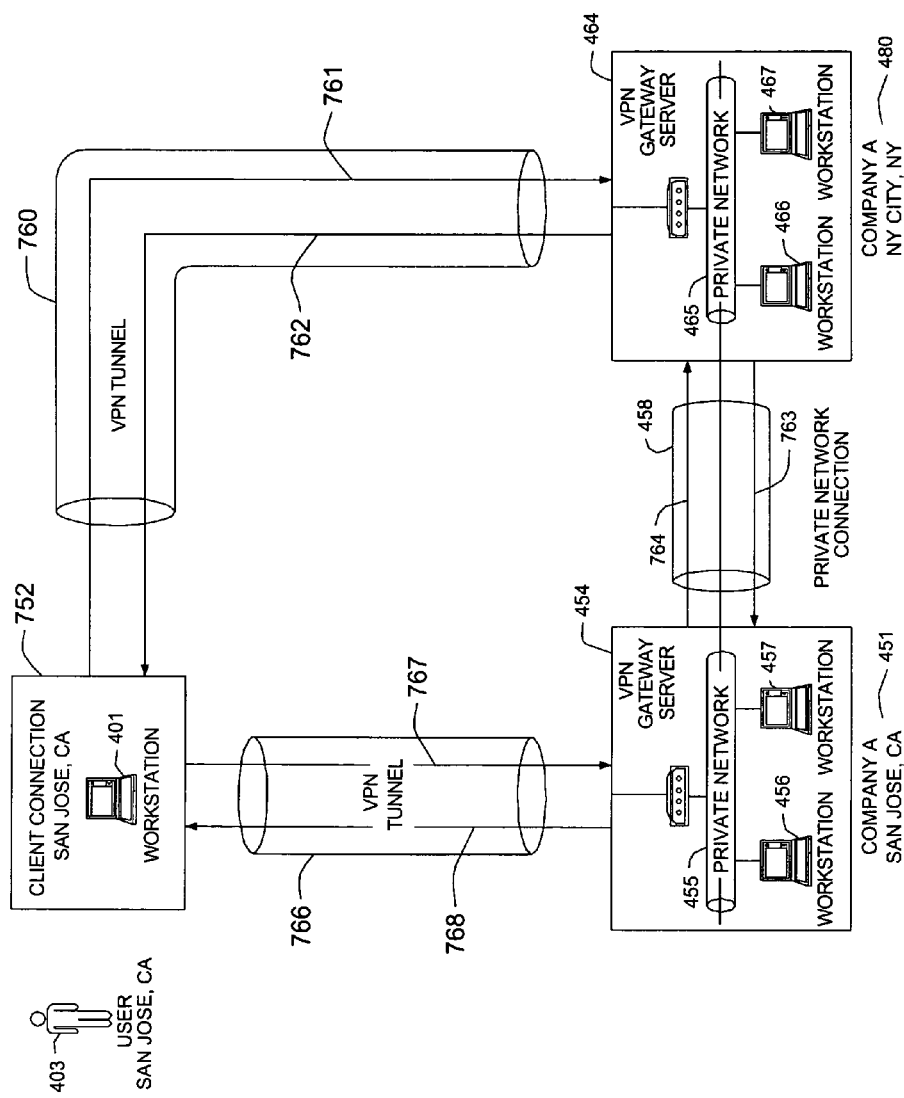
FIG. 7 is a block diagram illustrating the impact of the time delay problem, according to the Prior Art.
Figure 8:
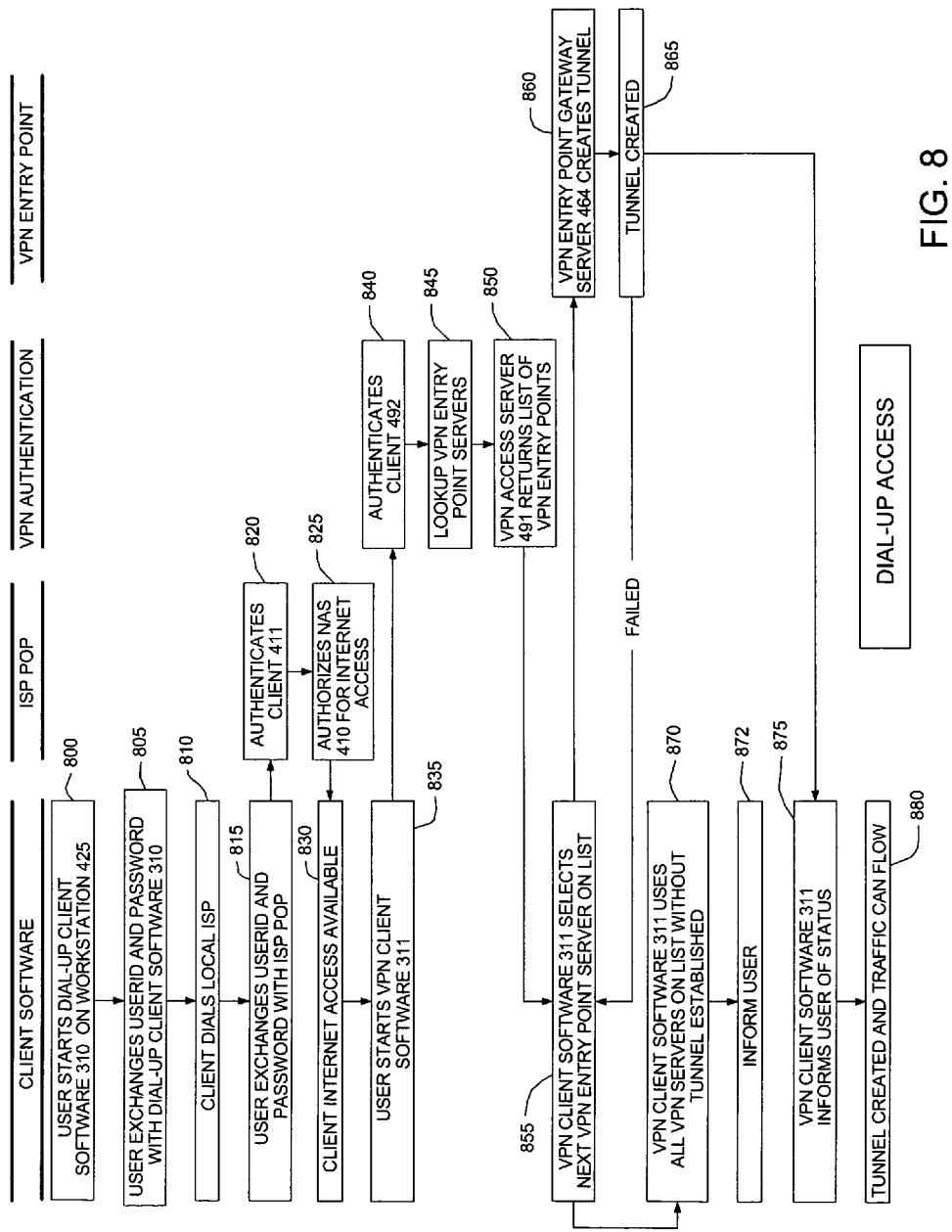
FIG. 8 is a flow chart of the process for establishing a secure VPN tunnel using a Dial-up Client, according to the Prior Art
Figure 9:
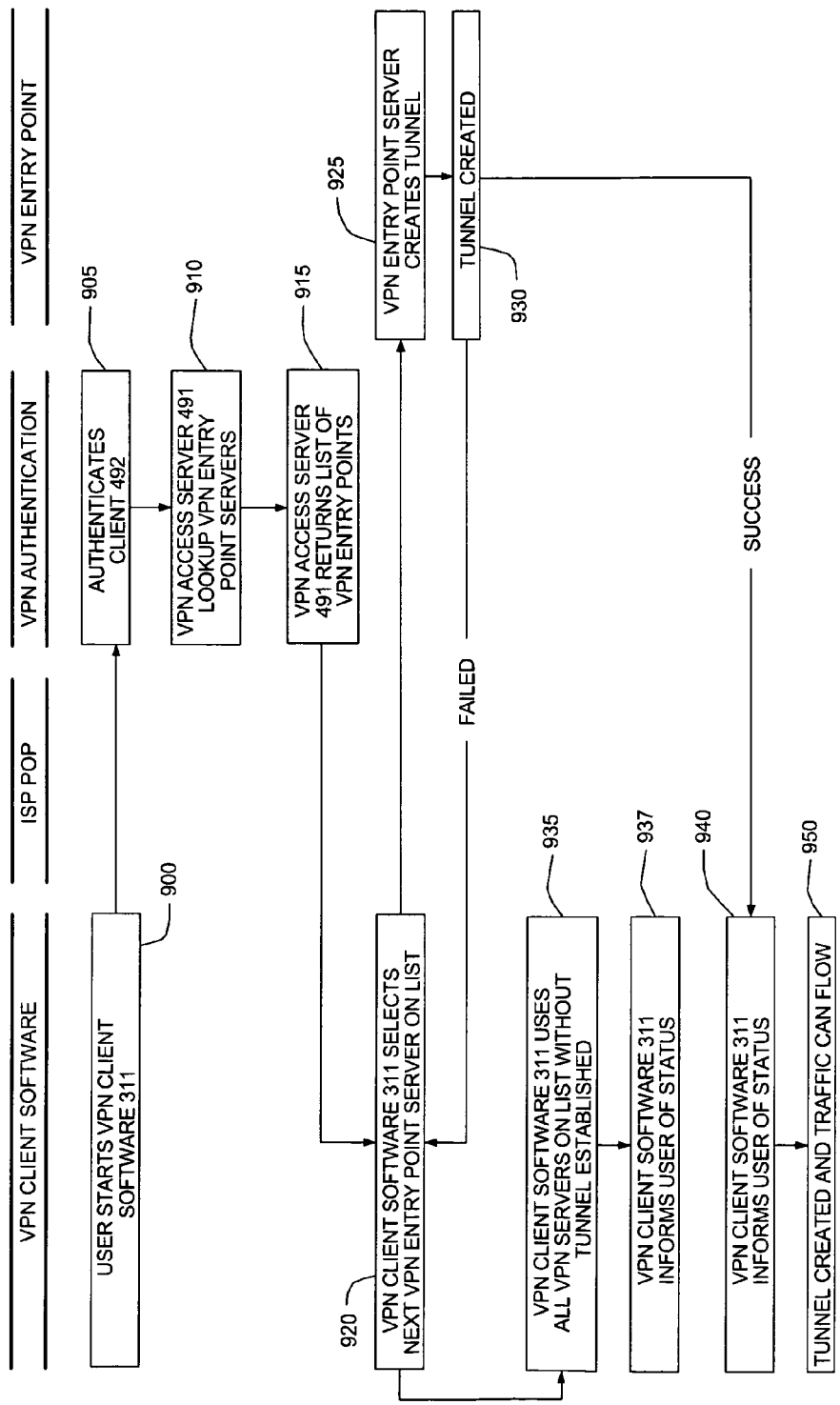
FIG. 9 is a flow chart of the process for establishing a secure VPN tunnel using a non-Dial-up Client, according to the Prior Art.
Figure 11:
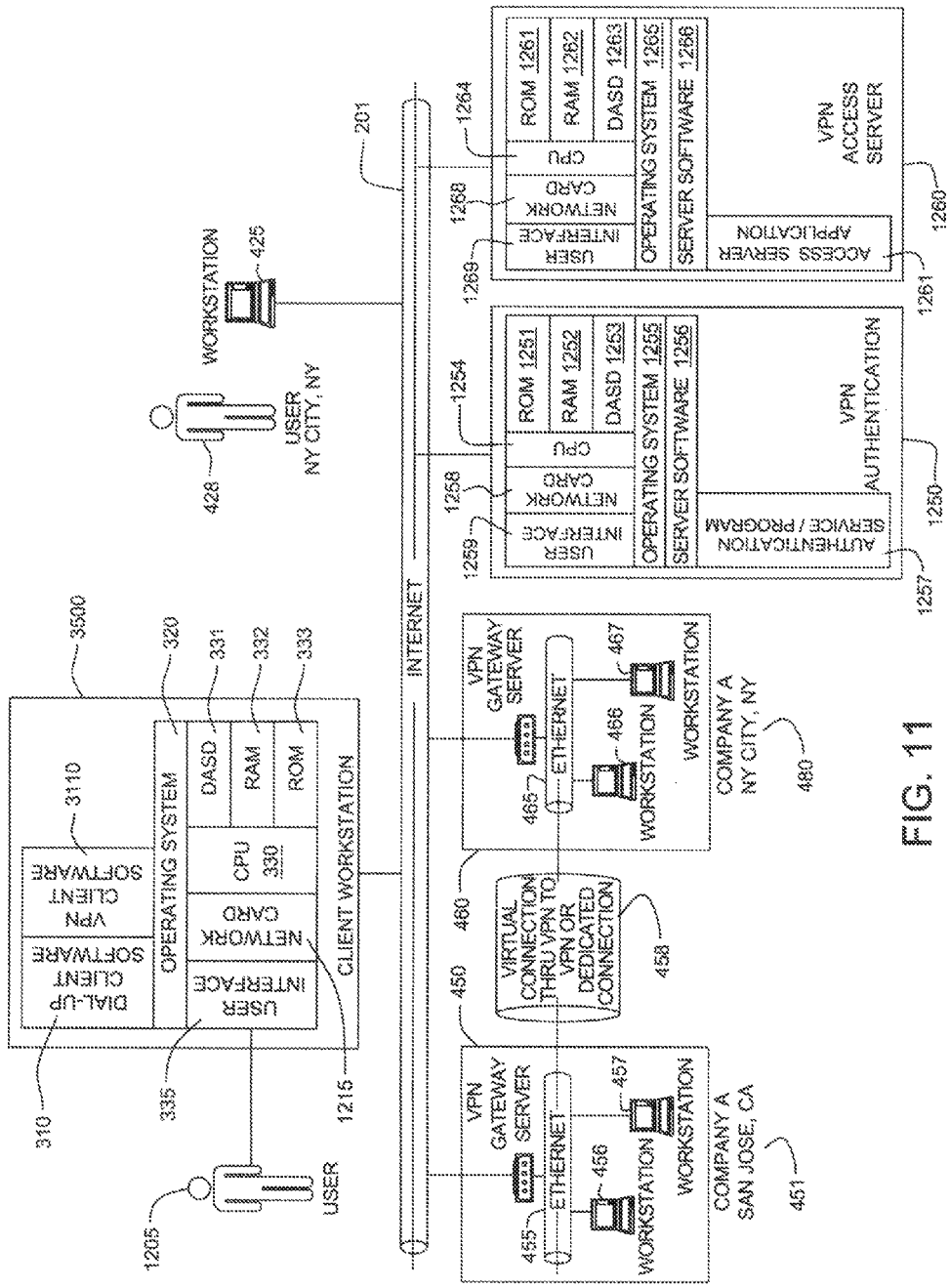
FIG. 11 is a block diagram showing details of the internals of the Client and VPN authentication service according to present invention.

The present invention will now be described in detail with reference to the figures. FIG. 11 illustrates a Client Workstation 3500 connected to the Internet 201. Workstation 3500 is similar to workstations 100, 103, 130, 133, 136, 150, 151 and 152, except for VPN client Software 3110 in Workstation 3500 instead of VPN client Software 311 in Workstations 100, 103, 130, 133, 136, 150, 151 and 152. FIG. 11 also illustrates a new VPN authentication service 1257 in VPN authentication server 1250 connected to the Internet 201. Authentication service 1257 is similar to the Prior Art authentication service 492 of the VPN server 490 illustrated in FIG. 4 except as noted below. Typically, there are many VPN entry point servers, e.g. 454, 464, for a company which has many locations. The Client Workstation 3500 comprises one or more CPUs 330 with associated DASD 331, Memory RAM 332 and ROM 333, a network card 1215, a user interface 335, an Operating System 320, and Client Software. The Client Software comprises Dial-up Client Software 310 and the VPN Client Software 3110. FIG. 11 also indicates the VPN authentication server 1250, comprising a CPU 1254, associated DASD 1253, Memory RAM 1252 and ROM 1251, a network card 1258, a user interface 1259, an Operating System 1255, and Server Software 1256. The Server software comprises the Authentication Service program 1257 which is stored on DASD 1253 for execution by CPU 1254 via RAM 1252. FIG. 11 also indicates a VPN access server 1260 comprising similar components (i.e. ROM 1261, RAM 1262, DASD 1263, CPU 1264, operating system 1265, server software 1266, network card 1268 and user interface 1269) to the VPN authentication server 1250 with the exception of the "VPN Access Server application 1267. VPN Access Server application 1267 is stored on DASD 1263 for execution by CPU 1264 via RAM 1262. The access server and the authentication server or services may be combined on the same system. These are similar to VPN access server 491 and authentication services 492 except where noted. By way of example, Client Workstation 3500 is located in San Jose, Calif. (similar to that of Workstation 401 of FIG. 4), and Client Workstation 3500 has gained access to the Internet 201.

Figure 10:
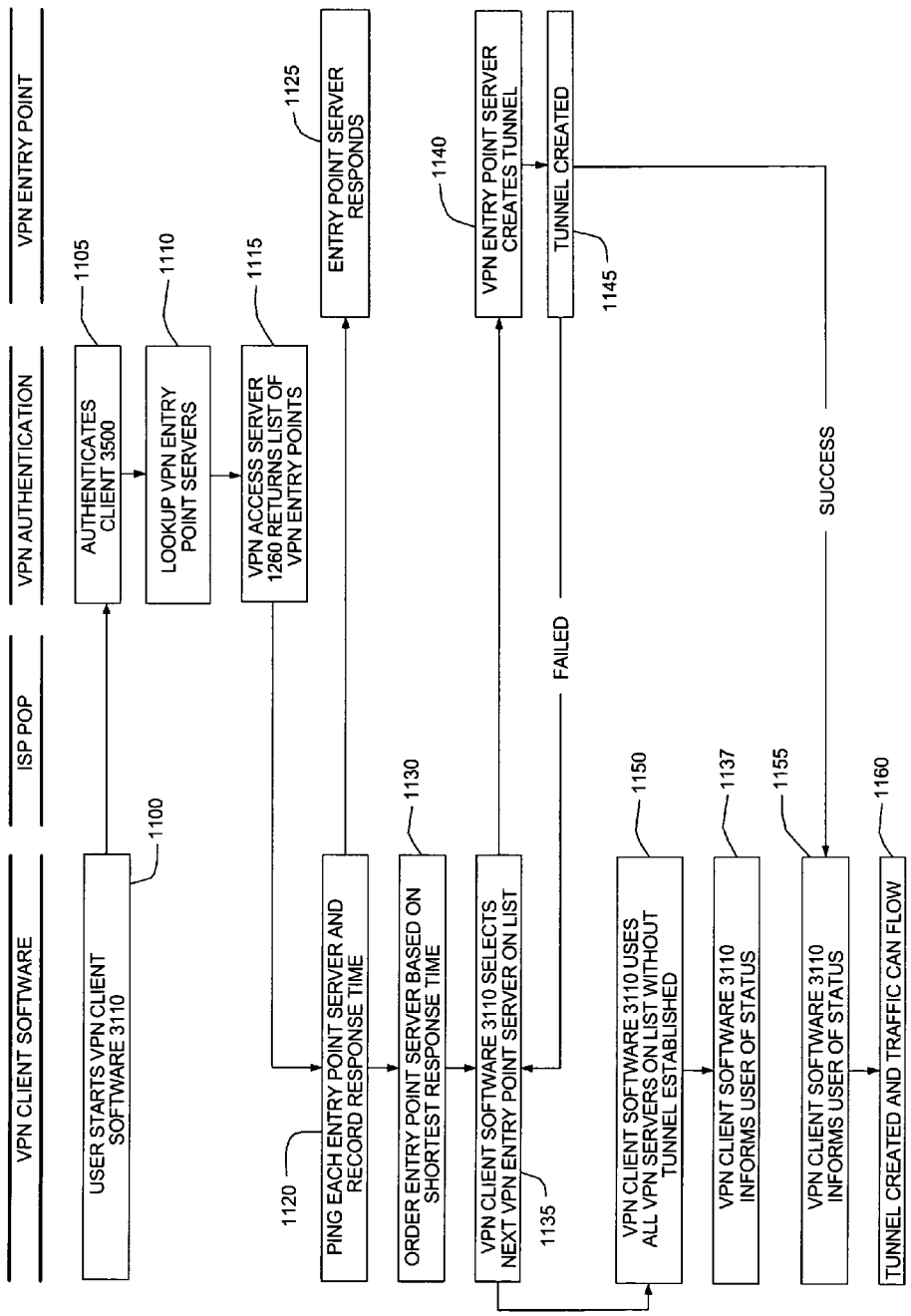
FIG. 10 is a flow chart of a process for establishing a secure connection from the Client to the target network via a VPN tunnel according to the present invention.

FIG. 10 illustrates a process, according to the present invention, for forming a connection between Workstation 3500 in San Jose, Calif. and Workstation 456 in Company A 451 San Jose, Calif. location. Initially, a User 1205 at the Client Workstation 3500 activates the VPN Client Software 3110 (step 1100). The VPN authentication service 1257 receives the authentication information e.g. UserID and encrypted password from VPN Client Software program 3110 via a protocol e.g. PPTP (Point to Point Tunneling Protocol), IPSEC (Internet Protocol Security), and then authenticates the user (step 1105). The authentication service 1257 determines, based on a table, what VPN network entry or access points the user is authorized for connection and the authentication service 1258 of 1260 generates the list of these VPN network entry points/access points (step 1115). Alternatively, 1257 could generate this list. The initial list can be ordered as in the Prior Art process, based on the proximity to the user's home location.

FIG. 11 illustrates two such entry points, VPN access point server 450 (in San Jose, Calif.) and VPN access point server 460 (in NYC, N.Y.), although typically there are more. The VPN authentication service then returns this list to the VPN Client Software 3110 in step 1115. Next, the VPN Client Software 3110 pings each VPN access point server in the list and measures the response time for a communication between the Client 3500 and each VPN access point in the list e.g. time from the client workstation 3500 to each VPN access point server 450 and 460. Next, the Client Software 3110 sorts the VPN access point servers in the list according to response time with the shortest response time being first in the list, followed by the VPN access point server with the next shortest response time, etc. (step 1130). Next, the VPN Client Software 3110 selects the first entry point server in the new list ordered by response time (shortest response time first) and attempts to make a tunnel connection (steps 1135 and 1140). Authentication and authorization may be performed by the VPN entry point gateway server 450 or VPN entry point gateway server 460. If the VPN Client Software is successful in establishing the connection (decision 1145, yes/success branch), it informs the user (step 1155) and creates the secure VPN tunnel between the client and the VPN entry point gateway server (step 1160). If the Client is unable to contact or connect to the first VPN entry point gateway server in the ordered list or the tunnel cannot be created (decision 1145, no/failed branch), the Client Software 3110 attempts to establish the connection with the next (in this iteration, second) VPN entry point server on the list (step 1135). If the VPN Client Software is successful in establishing the connection (decision 1145, yes/success branch), it informs the user (step 1155) and creates one end of the secure VPN tunnel (step 1160). If the Client is unable to contact or connect to the second VPN entry point gateway server in the ordered list or the tunnel cannot be created (decision 1145, no/failed branch), the Client Software 3110 attempts to establish the connection with the next (in this iteration, third entry point server on the list in step 1135. The foregoing loop of steps 1135, 1140, and 1145 are repeated until the VPN tunnel is established. If none of the entry point servers on the list is available to establish a VPN tunnel, the Client Software terminates this activity in step 1150 and informs the user in step 1137 and ends or exits. In general, with the reliability of modern networks the VPN Client Software typically connects to a valid VPN entry point server and creates a VPN tunnel on the first attempt. Consequently, the client will typically establish the VPN tunnel with the VPN access server with the shortest response time. Having created this VPN tunnel, all workstations and network devices on the private network can be accessible to the Client Workstation 3500 and the Client is accessible to them. All data transferred through the tunnel is encrypted and its contents are "effectively" hidden on the public Internet 201.

Throughout this invention, the term "ping" is used to indicate a generic method to measure the response time from one server or service to another server or service. The function PING (e.g. in Microsoft's Windows environment) is on implementation that measures this response time. There are many other methods to measure this time which are considered as alternate implementations to generate this timing information.

In another embodiment, the VPN authentication service 1257 requests each VPN entry point server from the list of authorized VPN entry point gateway servers e.g. 450, 460, to determine the response time to the Client Workstation 3500. Each VPN entry point gateway server reports back to the authentication service 1257, and the authentication service 1257 orders the list of VPN entry point servers based on shortest response time (i.e. shortest response time first). Then, the access server 1260 returns the ordered list to the Client Software to determine the order in which the Client Software attempts to establish the VPN connections. In another embodiment the access server 1260 could provide the collection point for the response time and VPN list ordering function. In another implementation, the authentication service 1257 provides the ordering and return function.

Figure 12:
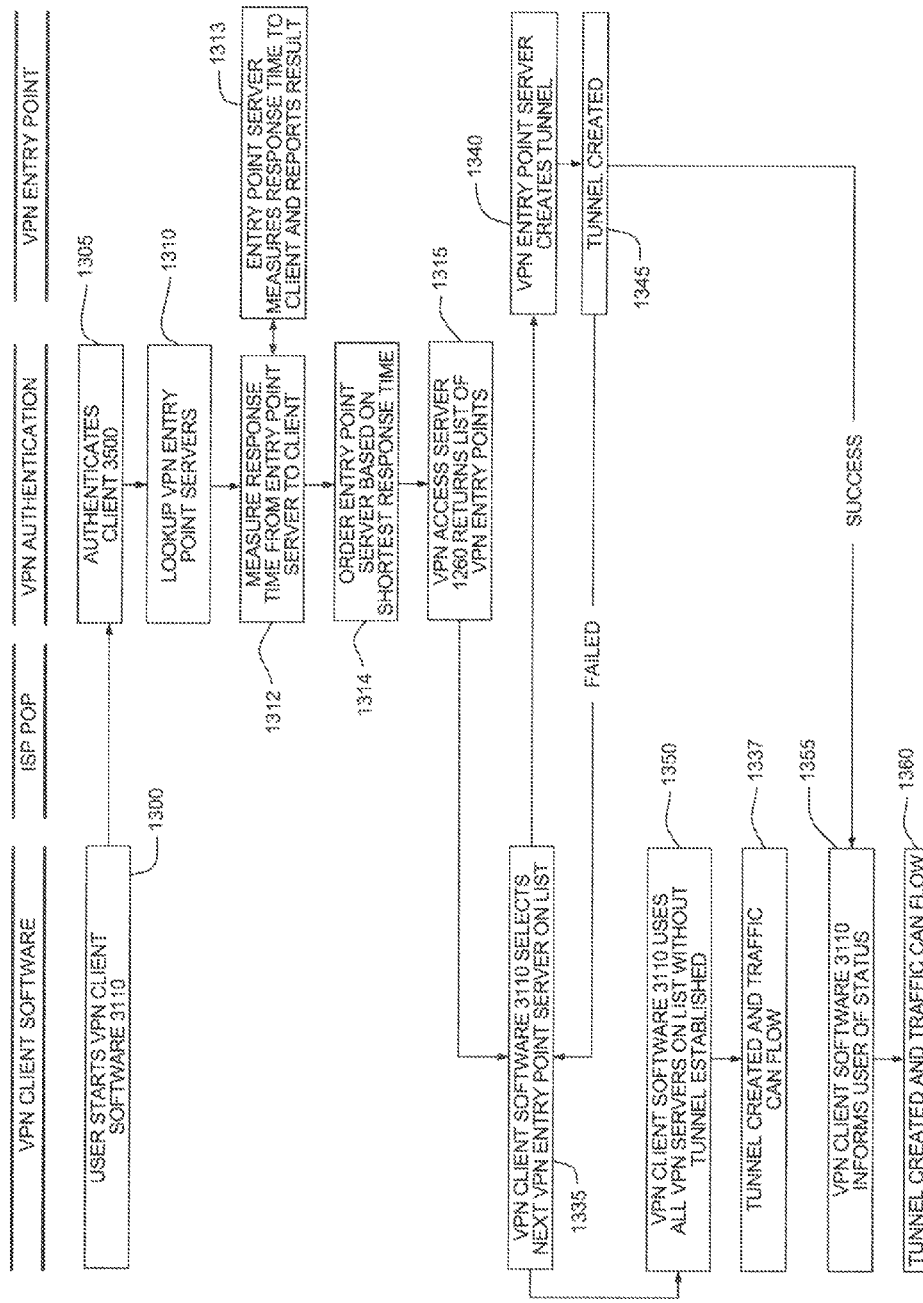
FIG. 12 is a flow chart of an alternate embodiment of the present invention for establishing a secure connection from the Client to a target network via a VPN tunnel.
Figure 13:
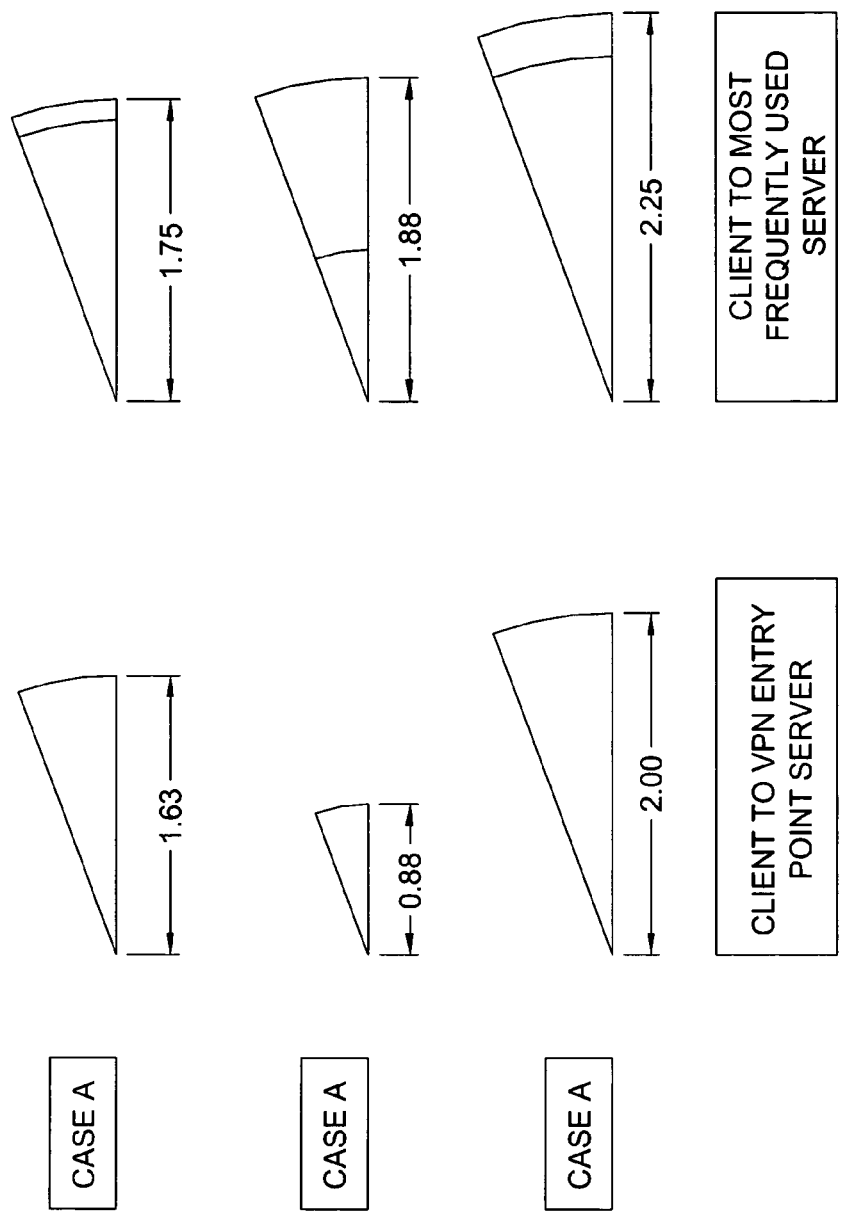
FIG. 13 is a set of graphics showing opportunities for the present invention to reduce latency impacts.

FIG. 12 illustrates this other embodiment of the present invention in more detail. The VPN authentication service 1257 receives from the Client the authentication information e.g. UserID and encrypted password from VPN Client Software program 3110 via a protocol e.g. PPTP (Point to Point Tunneling Protocol), IPSEC (Internet Protocol Security) (step 1300) and then authenticates the user (step 1305). The authentication service 1257 determines, based on a table, what VPN network entry points the user is authorized for connection and generates the list of these access points (step 1310). Next, the VPN authentication service 1257 requests each VPN entry point server from the list of authorized VPN entry point servers e.g. 450, 460, to determine the response time to the Client 3500 (step 1312). In response, each VPN entry point server pings the client, determines the response time and reports it back to the client (step 1313). Next, the authentication service 1257 orders the list of VPN entry point servers based on shortest response time (i.e. shortest response time first) (step 1314). Then, the authentication service returns the ordered list to the Client Software which defines the order in which the Client Software attempts to establish the VPN connections (step 1315). Next, the VPN Client Software selects the first entry point in the new list ordered by response time (shortest response time first) (step 1335) and attempts to make a connection (step 1340). Authentication and authorization may be performed by the VPN entry point server such as 450 or 460 If the VPN Client Software 3110 is successful in establishing the connection (decision 1345, yes/success branch), it informs the user (step 1355) and completes creating the remaining end of the secure VPN tunnel (step 1360) with the other end being the client 3110. If the Client is unable to contact or connect to the first VPN entry point server or the tunnel cannot be created (decision 1345, no/failed branch), the VPN Client Software 3110 attempts to establish the connection with the next (in this iteration, second) entry point server on the list in step 1335. If the VPN Client Software is successful in establishing the connection (decision 1345, yes/success branch), it informs the user (step 1355) and creates the remaining end of the secure VPN tunnel (step 1360). If the Client is unable to contact or connect to the first VPN entry point server or the tunnel cannot be created (decision 1345, no/failed branch), the VPN Client Software 3110 attempts to establish the connection with the next (in this iteration, third entry point server on the list in step 1335. The foregoing loop of steps 1335, 1340, and 1345 are repeated until the VPN tunnel is established. Should all entry point servers on the list be exhausted without establishing a VPN tunnel, the VPN Client 3110 software terminates this activity in step 1350 and informs the user in step 1337 and ends or exits. In general, with the reliability of modern networks the VPN Client Software 3110 almost always connects to a valid VPN entry point server and creates a VPN tunnel on the first attempt. Having created this VPN tunnel, all workstations and network devices on the private network can be accessible to the Client 3500 and the Client is accessible to them. All data transferred through the tunnel is encrypted and its contents are "effectively" hidden on the public Internet 201.

In another embodiment, the VPN authorization service or server and VPN access service or servers may be combined together. In another embodiment, the request to collect timing information and order the list can be provided by either the authorization or the access service or servers In another embodiment of the present invention, the round trip latency times are collected and stored in a historical database. This historical information can then be rapidly extracted and used as the sort criteria to determine the shortest time delay path eliminating the need to do a response time measurement prior to giving the VPN Client Software 3110 the information to start the creation of a tunnel process e.g. steps 920-925. While this method provides faster response in establishing a VPN tunnel, as it is not real time, it does not capture real time events where an entry point server is off line or under sever performance constraints. This historical data can be retained at the VPN Authentication service 1257.

In another embodiment of the present invention, the VPN Client Software authenticates with the VPN authentication and authorization service 1257 in step 1100 and 1105. Once authenticated, the authorization service 1257 determines the list of authorized VPN entry point servers in step 1110 and returns this list to the VPN Client Software in step 1115. The VPN Client Software 3110 then determines the response time of a round trip communication to each of the VPN Entry Point servers found on the list in step 1120 and 1125. The VPN Client Software 3110 then sorts the entry point server list with shortest response time first in step 1130. The VPN Client Software 3110 then selects the first or next VPN entry point server from the list and attempts to establish a VPN tunnel in step 1135 and 1140. If the tunnel is successfully created in step 1145, the VPN Client Software is notified in step 1155 and informs the user in step 1160. If the VPN tunnel is not created successfully, the VPN Client Software is notified in Step 1135 and the next candidate entry point server is selected from the list. Should all candidates be unsuccessful in establishing a VPN tunnel in step 1150, the Client informs the user in step 1155 and terminates its execution.

In another embodiment of the present invention, the Client uses a process whereby some randomness added in selecting the most optimal VPN entry point server to create a VPN tunnel. This results in the Client not selecting the same server at all times. The Client after having established a VPN tunnel with the target VPN entry point server, tracks Client to server contacts within the private network collecting the Server identification information, round trip latency time from Client to Server, frequency of use, volume of traffic to and from the specific server and the VPN entry point that was used. Over a period of time where many different VPN entry point servers are used to connect to servers on the private network, determination of the best VPN entry point can be further optimized without interaction from the user or VPN authentication service. For example, using the shortest time for Client to VPN entry point server indicates that Case B is the best choice. Simple entry point optimization can produce significant reductions in the round trip latency. However, using data from the Server within the private network that had the highest frequency of contact or had the most amount of data transferred in addition to that from the simple entry point optimization demonstrates that further gains are possible e.g. Case A is faster.

In another embodiment of the present invention, non-use periods of the VPN tunnel are detected and the tunnel is terminated and switched to an alternate VPN entry point server. Statistics are gathered on round trip latency for Servers accessed on the private network which were frequently contacted or which had heavy amounts of data transfer by the Workstation on prior connections. After the data has been collected, the VPN is again terminated and another entry point server is contacted. This continues until use resumes on the workstation or until sufficient statistics have been collected. These statistics are collected and used to adaptively modify the selection algorithm of VPN entry point servers having the shortest response time and of the servers within the private network having the shortest latency time as well. This data is used to preferentially select entry points having the best probability to provide the lowest latency time for the servers that the client Workstation contacts. This self tuning of the selection process is an autonomic control.

All of the foregoing computer programs, including the VPN authentication services 1257 and VPN access service 1267, and Client Software 3110, can be loaded into the computers in which they execute from a computer readable media such as magnetic tape or disk, optical disk, DVD, semiconductor memory, etc. or downloaded via the Internet.

Based on the foregoing, system, method and program product for determining a network path between a Client Workstation and a target network have been disclosed. However, numerous modifications and substitutions can be made without deviating from the scope of the present invention. For example, an adaptive process control algorithm can be used to preferentially select entry point servers that have minimal peak traffic loads during the period of time the Client is accessing the private network. This can be determined based on historical data and server responsiveness. This augments the system, method and program for determining the connection point. Therefore, the present invention has been disclosed by way of illustration, and not limitation, and reference should be made to the following claims to determine the scope of the present invention.

What is claimed:

1. A method for routing a message from a portable workstation to a target network, the method comprising the steps of:

the workstation sending authentication information of a user to a Virtual Private Network ("VPN") authentication server, and in response, the VPN authentication server determining a plurality of VPN entry point servers for which the user is authorized to use, and returning to the workstation a list of the plurality of VPN entry point servers, and in response, the workstation pinging the plurality of VPN entry point servers in the list to determine a first one of the VPN entry point servers which has a shortest communication response time with the workstation, and in response, the workstation establishing a connection with the first VPN entry point server;

in response to the workstation having established the connection with the first VPN entry point server, the workstation requesting from the first VPN entry point server data indicating: (a) actual round trip latency times of data transferred between the workstation and each of the VPN entry point servers and (b) actual frequencies or volumes of data transferred between the workstation and each of the VPN entry point servers; and the workstation receiving the data collected by the first VPN entry point server and based on the data, the workstation determining a second one of the VPN entry point servers which has a least round trip latency time of data transfer with the workstation and more than a predetermined frequency or volume of data transfer with the workstation, and in response, the workstation establishing a connection with the second VPN entry point server.

2. The method of claim 1, wherein the second VPN entry point server has a least round trip latency time of data transfer with the workstation and more than a predetermined frequency of data transfer with the workstation.

3. The method of claim 1, wherein the second VPN entry point server has a least round trip latency time of data transfer with the workstation and more than a predetermined volume of data transfer with the workstation.

4. A computer program product for routing a message from a portable workstation to a target network, the computer program product comprising one or more computer-readable storage devices and program instructions stored on at least one of the one or more storage devices, wherein the program instructions comprise:

program instructions to send, by the workstation, authentication information of a user to a Virtual Private Network ("VPN") authentication server, and in response, to determine, by the VPN authentication server, a plurality of VPN entry point servers for which the user is authorized to use, and to return to the workstation a list of the plurality of VPN entry point servers, and in response, to ping, by the workstation, the plurality of VPN entry point servers in the list to determine a first one of the VPN entry point servers which has a shortest communication response time with the workstation, and in response, to establish, by the workstation, a connection with the first VPN entry point server;

program instructions to request, by the workstation from the first VPN entry point server in response to the workstation having established the connection with the first VPN entry point server, data indicating: (a) actual round trip latency times of data transferred between the workstation and each of the VPN entry point servers and (b) actual frequencies or volumes of data transferred between the workstation and each of the VPN entry point servers; and program instructions to receive, by the workstation, the data collected by the first VPN entry point server and based on the data, to determine, by the workstation, a second one of the VPN entry point servers which has a least round trip latency time of data transfer with the workstation and more than a predetermined frequency or volume of data transfer with the workstation, and in response, to establish, by the workstation, a connection with the second VPN entry point server.

5. The computer program product of claim 4, wherein the second VPN entry point server has a least round trip latency time of data transfer with the workstation and more than a predetermined frequency of data transfer with the workstation.

6. The computer program product of claim 4, wherein the second VPN entry point server has a least round trip latency time of data transfer with the workstation and more than a predetermined volume of data transfer with the workstation.

7. A method for routing a message from a portable workstation to a target network, the method comprising the steps of:

the workstation sending authentication information of a user to a Virtual Private Network ("VPN") authentication server, and in response, the VPN authentication server determining a plurality of VPN entry point servers for which the user is authorized to use, and returning to the workstation a list of the plurality of VPN entry point servers, and in response, the workstation pinging the plurality of VPN entry point servers in the list to determine a first one of the VPN entry point servers which has a shortest communication response time with the workstation, and in response, the workstation establishing a connection with the first VPN entry point server;

in response to the workstation having established the connection with the first VPN entry point server, the workstation requesting from the first VPN entry point server data indicating: (a) a frequency of use of each VPN entry point server, (b) volume of data transferred between the first VPN entry point server and each of the other VPN entry point servers, and (c) actual round trip latency times of data transferred between the workstation and each of the VPN entry point servers; and the workstation receiving the data collected by the first VPN entry point server and based on the data, the workstation determining a second one of the VPN entry point servers which has a highest frequency of use or has a highest volume of data transferred with the first VPN entry point server, and in response, the workstation establishing a connection with the second VPN entry point server.

8. The method of claim 7, wherein the second VPN entry point server has a highest frequency of use.

9. The method of claim 7, wherein the second VPN entry point server has a highest volume of data transferred with the first VPN entry point server.

* * * * *